US009946996B1

(12) United States Patent
Bedell

(10) Patent No.: US 9,946,996 B1
(45) Date of Patent: Apr. 17, 2018

(54) METHODS, SYSTEMS AND ARTICLES FOR PROVIDING FINANCIAL ACCOUNT INFORMATION FOR SETTING UP DIRECT DEPOSIT OF PAY CHECKS

(71) Applicant: Intuit Inc., Mountain View, CA (US)

(72) Inventor: David Bedell, Morgan Hill, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 14/089,670

(22) Filed: Nov. 25, 2013

(51) Int. Cl.
*G06Q 20/10* (2012.01)

(52) U.S. Cl.
CPC .................... *G06Q 20/10* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| 6,587,841 | B1 * | 7/2003 | DeFrancesco | G06Q 20/10 705/35 |
| 7,020,631 | B2 * | 3/2006 | Freeman | G06Q 20/102 705/35 |
| 7,386,504 | B2 * | 6/2008 | McDonald | G06Q 40/00 705/38 |
| 7,630,932 | B2 * | 12/2009 | Danaher | G06Q 40/02 705/37 |
| 7,941,351 | B1 | 5/2011 | Rosenfeld et al. | |
| 8,204,809 | B1 * | 6/2012 | Wise | 705/35 |
| 8,271,360 | B1 | 9/2012 | Schmier et al. | |
| 8,527,381 | B2 * | 9/2013 | Gerstner et al. | 705/35 |
| 2003/0149660 | A1 * | 8/2003 | Canfield | 705/39 |
| 2007/0118449 | A1 * | 5/2007 | De La Motte | 705/35 |
| 2008/0065532 | A1 * | 3/2008 | De La Motte | 705/39 |
| 2010/0094697 | A1 * | 4/2010 | Cavanaugh | 705/14.17 |
| 2013/0135582 | A1 * | 5/2013 | Hanebuchi et al. | 351/206 |

* cited by examiner

*Primary Examiner* — Frantzy Poinvil
(74) *Attorney, Agent, or Firm* — Vista IP Law Group LLP

(57) ABSTRACT

Systems and methods for providing financial account information for an employee for setting up direct deposit of pay checks into a financial account of the employee. A financial services system receives a request from a payroll processor of an employer of the employee for account information for a financial account held by the employee, the request including personal information of the employee. The financial services system searches a database for a financial account held by the employee and identifies a financial account held by the employee by matching the personal information received in the request with corresponding information associated with a matching financial account stored in the database. The financial services system transmits the financial account information for the matching financial account sufficient to set up direct deposit to the payroll processor. The payroll processor then sets up direct deposit of the employee's pay checks into the matching financial account.

22 Claims, 4 Drawing Sheets

METHODS, SYSTEMS AND ARTICLES FOR PROVIDING FINANCIAL ACCOUNT INFORMATION FOR SETTING UP DIRECT DEPOSIT OF PAY CHECKS

SUMMARY

Embodiments of the present invention are directed to methods, systems, and articles of manufacture for providing financial account information for setting up direct depositing payroll for an employee, without the employee having to provide bank account information for the direct deposit of the employee's pay checks.

Many employers offer the option of direct deposit of pay checks to their employees. Direct deposit of payroll by companies is convenient and efficient for both the employer and the employee. Generally, direct deposit of pay checks simply describes a deposit of money for the amount of the employee's pay check directly from a payor financial account (the employer's financial account or the financial account of the employer's payroll processor) to the employee's financial account, such as a bank account, by electronic funds transfer. In the United States, the electronic funds transfer may be accomplished through an electronic payment system such as the Automated Clearing House (ACH).

However, when an employee signs up for direct deposit with their employer, they often do not have the required financial account information needed by the employer in order to set up direct deposit.

Accordingly, the present invention is directed to methods, systems and articles of manufacture for obtaining financial account information for an employee for setting up direct deposit of pay checks into a financial account of the employee, using personal information of the employee, and in some cases, a name of a financial institution at which the financial account is held.

In one embodiment, the present invention is directed to a computer-implemented method for providing the employee's financial account information for direct deposit of pay checks. Typically, the method is implemented on a financial services system comprising one or more computers, in which the computers include at least one computer processor, memory and software application(s) programmed to perform the steps of the method.

In the method, the financial services system has a database of financial account information from financial accounts at a plurality of financial institutions. The financial services system may build the database by electronically accessing the financial account information from the databases of each of the plurality of financial institutions, such as through an internet connection or private network, by loading the data into the database from storage devices, or other suitable means of obtaining the electronic financial account information. The database includes sufficient information regarding the financial account holders to match the financial account information with personal information, as described below, as well as the account information sufficient to set up direct deposit of employee pay checks into the respective financial account of the employee.

A payroll processor, such as the accounting department of the employer or a payroll processing company (e.g. Intuit, Inc., ADP, Inc., or Paychex, Inc.), has an employee to set up direct deposit, and has personal information of the employee such as name and social security number (SSN), but does not have the financial account information for the financial account of the employee to which direct deposit is to be made. The payroll processor sends a request to the financial services system requesting the financial account information for setting up the direct deposit. The financial services system then receives the request from the payroll processor for account information for a financial account held by the employee. The request includes personal information of the employee, such as the employee's name and SSN, which is then used to identify a financial account of the employee within the database of the financial services system.

The financial services system searches the database for a financial account held by the employee and identifies a financial account held by the employee by matching the personal information received in the request with corresponding information associated with a matching financial account stored in the database. Finally, the financial services system transmits the financial account information for the matching financial account to the payroll processor, including sufficient information to set-up direct deposit of the employee's pay checks into the matching financial account, such as the routing number and account number for the financial account. The financial account information may be encrypted to protect information from unauthorized access.

The payroll processor may then decrypt the financial account information and set up direct deposit of pay checks for the employee.

In another embodiment of the method, instead of searching a database of financial account information, the financial services system may access the financial account information directly from the financial institution which holds the financial account. In this case, the employee would typically also provide the name of the financial institution of the employee's financial account into which the employee is requesting direct deposit of pay checks. Then, the payroll processor sends a request to the financial services system for financial account information for the financial account. The request includes an identification of the financial institution, and personal information of the employee which is used to identify the employee's financial account at the financial institution. The financial services system receives the request from the payroll processor for account information for the financial account held by the employee.

The financial services system then requests financial account information from the financial institution regarding the financial account. The financial services system knows which financial institution holds the financial account because the request from the payroll processor includes this information. The request from the financial services system also includes personal information of the employee, such as name and SSN, so that the financial institution can identify the employee's financial account.

The financial services system them receives the financial account information from the financial institution, including sufficient financial information to set-up direct deposit, such as routing number and account number. Finally, the financial services system transmits the financial account information sufficient to set-up direct deposit to the payroll processor. Again, this financial account information may be encrypted. The payroll processor may then decrypt the financial account information and set up direct deposit of pay checks for the employee.

Another embodiment of the present invention is directed to a system for implementing any of the above-described methods for providing financial account information for an employee for setting up direct deposit of pay checks into a financial account of the employee. The system comprises a financial services system which is in operable communication with a payroll processor and/or a plurality of financial institutions, such as via the internet or a private network. The financial services system comprises one or more computers having software configured to perform the methods steps performed by the financial services system as described above. The financial services system is configured to access financial account information from a plurality of financial institutions through a communication network, such as the internet, a private network, or data storage device(s). The financial services system is configured to perform a process according to any of the method embodiments of the present invention, including for example, a process comprising: (i) receiving a request from a payroll processor of an employer of the employee for account information for a financial account held by the employee, the request including personal information of the employee; (ii) searching the database for a financial account held by the employee and identifying a financial account held by the employee by matching the personal information received in the request with corresponding information associated with a matching financial account stored in the database; and (iii) transmitting to the payroll processor, account information for the matching financial account, the financial account information sufficient to set-up direct deposit of the employee's pay checks into the matching financial account.

In another embodiment, the financial services system is configured to perform a process comprising: (i) receiving a request from a payroll processor of an employer of the employee for account information for a financial account held by the employee at a financial institution into which the employee is requesting direct deposit of pay checks, the request including personal information of the employee and the name of the financial institution; (ii) requesting financial account information from the financial institution regarding the financial account using the personal information; (iii) receiving financial account information sufficient to set-up direct deposit of the employee's pay checks into the matching financial account; and (iv) transmitting to the payroll processor the financial account information sufficient to set-up direct deposit of the employee's pay checks into the financial account.

Another embodiment is directed to an article of manufacture comprising a non-transitory computer program carrier readable by a computer and embodying instructions executable by the computer to program a computer system to perform the steps of at least one of the method embodiments for providing financial account information for an employee for setting up direct deposit of pay checks into a financial account of an employee, including, for example: (i) receiving a request from a payroll processor of an employer of the employee for account information for a financial account held by the employee, the request including personal information of the employee; (ii) searching the database for a financial account held by the employee and identifying a financial account held by the employee by matching the personal information received in the request with corresponding information associated with a matching financial account stored in the database; and (iii) transmitting to the payroll processor, account information for the matching financial account, the financial account information sufficient to set-up direct deposit of the employee's pay checks into the matching financial account.

In yet another embodiment of the non-transitory computer readable medium, the process comprises: (i) receiving a request from a payroll processor of an employer of the employee for account information for a financial account held by the employee at a financial institution into which the employee is requesting direct deposit of pay checks, the request including personal information of the employee and the name of the financial institution; (ii) requesting financial account information from the financial institution regarding the financial account using the personal information; (iii) receiving financial account information sufficient to set-up direct deposit of the employee's pay checks into the matching financial account; and (iv) transmitting to the payroll processor the financial account information sufficient to set-up direct deposit of the employee's pay checks into the financial account.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Embodiments of the present invention are directed to computerized systems, methods and articles of manufacture for providing financial account information for an employee for setting up direct deposit of pay checks into a financial account of the employee. In general, a financial services provider builds a database of financial account information on a computer system. The database includes key account information which can be matched to personal information of the account holder, such as social security number (SSN), name, address, email, phone number, or the like, as well as the account information required to set up direct deposit, such as bank routing number and account number. When an employee wants to enroll in direct deposit of pay checks from her employer into her financial account with a financial institution such as a bank, the employee often does not have the required financial account information needed to set up direct deposit. In such case, the employee may provide certain personal information such as name, SSN, address, etc. In fact, most or all of such information would be provided by the employee to the employer in order to apply for and register for employment with the employer. Then, the payroll processor (e.g. the employer's accounting department or human resources department, or a third party payroll processor such as ADP, Inc.) sends certain personal information of the employee to the financial services system which receives the request for the account information including the personal information of the employee. The financial services system then searches the database for a financial account held by the employee by matching the personal information with the account information in the database. The financial services system then transmits the financial account information sufficient to set up direct deposit to the payroll processor. The payroll processor may then set up direct deposit of pay checks for the employee.

Figure 1:
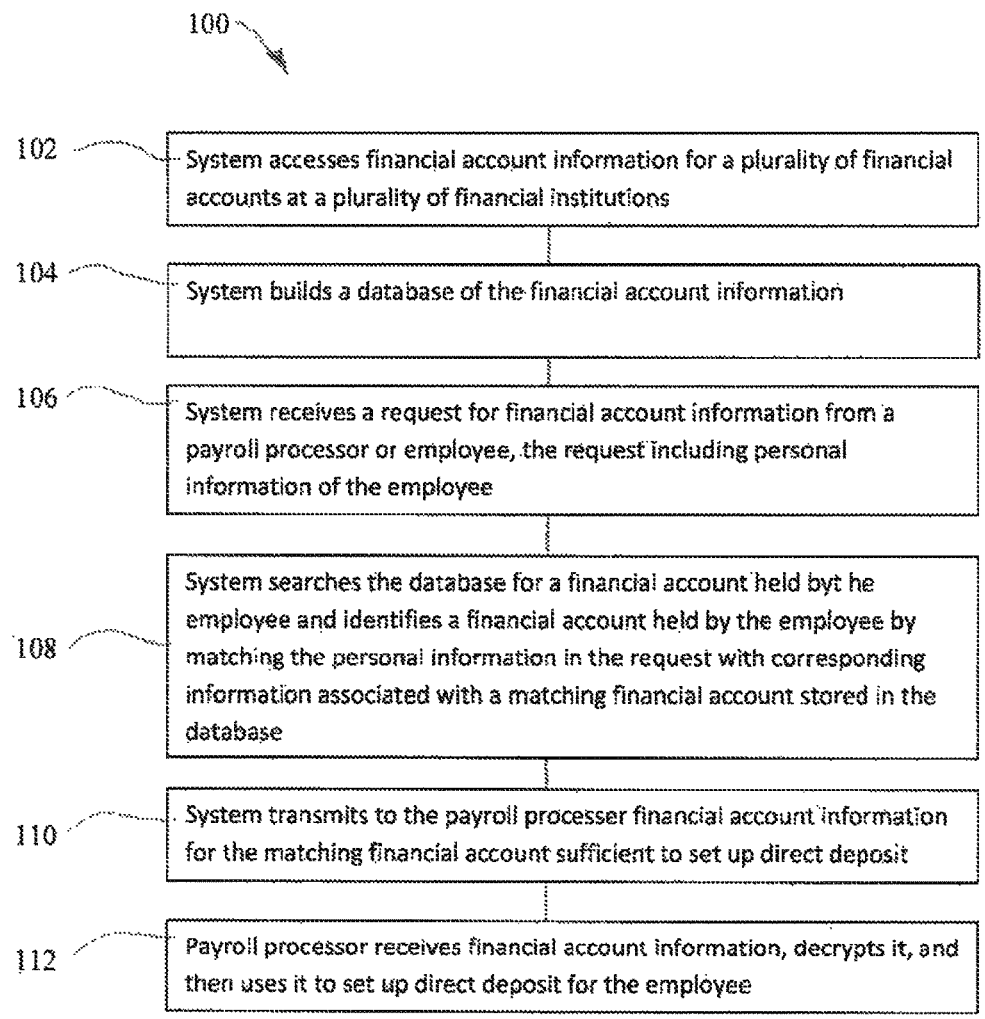
FIG. 1 is a flow chart of a method for providing financial account information for an employee for setting up direct deposit of pay checks into a financial account of an employee, according to one embodiment of the present invention.

Referring to FIG. 1, in one embodiment, a computer-implemented method 100 for providing financial account information to set up direct deposit of pay checks into a financial account of an employee is shown. As described in more detail below with reference to FIGS. 3 and 4, the method 100 is typically implemented on a computerized financial services system 202 comprising one or more computers having at least one computer processor (i.e. microprocessor) and memory, as well as computer servers, a data storage system and other hardware and software application(s) for performing the method 100. The financial services system may be provided and operated by a third party services provider, or even a financial institution, such as a bank, stock broker or other financial services company. The system may also include an online component such as a website so that user can access and utilize the system through the internet or a private network. The financial services system for implementing the method 100 may be part of a more comprehensive financial services system which provides a multitude of financial services, or it may be a standalone system.

The method 100 comprises a step 102 in which the financial services system electronically accesses financial account information/data for a plurality of financial accounts at a plurality of financial institutions. For instance, the financial information of the user may be accessed from financial institutions like banks, credit card companies, and/or investment companies, or from a source that aggregates financial account information. The financial information for each financial account includes sufficient information to match the financial account with the holder of the account based on personal information of the holder, such as name, SSN, address, phone number, email address. The financial account information also includes sufficient information for each financial account to set up direct deposit of pay checks to the financial account, including, for example, a bank routing number (also called a "routing transit number", American Bankers Association (ABA) routing number, or a SWIFT or IBAN number for foreign accounts), account number and/or financial institution identifying information (such as the name of the financial institution, address, or other identifier).

The financial information may be accessed by the financial services system by any one or more suitable methods. As some examples, the financial information may be obtained by accessing financial information from the servers and/or storage devices of financial institutions and other financial account information sources through a network connection such as the internet or private network, or by transferring storage media such as CDs, tape drives, hard disks, or the like.

At step 104, the financial services system builds a database, such as a relational database, using the financial account information. The database may be stored on a data storage system. The database may be encrypted to prevent unauthorized access to the financial account information in the database.

Alternatively, instead of accessing the information and building the database of financial account information, the financial services system may simply obtain the completed database from a provider that has already built the database. Again, the database may be encrypted to prevent unauthorized access to the financial account information in the database At step 106, the financial services system receives a request for financial account information for setting up direct deposit for an employee from a client, such as an employer or payroll processing service (e.g. ADP, Inc., Paychex, Inc., Intuit, Inc. or the like), referred to collectively as a payroll processor. As described above, the payroll processor may have a new employee to add to direct deposit of pay checks, or a current employee that wants to change to direct deposit, or even an employee that wants to change her financial account for direct deposit. The request is sent from the payroll processor to the financial services system by any suitable means. For instance, the financial service system may be accessible by the client through a secure website, in which the client logs in and then enters the request through the website. As another means, the client may send an email request to the provider of the financial service system. The email may then be processed by a representative or automated/computerized system which then enters the request into financial services system. As another alternative, the employee may send the request through a website or email. The request includes personal information of the employee, such as one or more of the employee name, SSN, residence address, phone number, and/or email address. For example, the request may include such combinations as (a) name and SSN; (b) name and residence address; (c) name and phone number; (c) name and email address; (d) SSN and residence address; (e) SSN and phone number; (f) name, SSN, and address; or any other combination of these items of personal information.

At step 108, the financial services system searches the database for a financial account held by the employee by matching the personal information received in the request with corresponding information associated with a matching financial account stored in the database. For instance, if the request includes a name and SSN, the financial services system searches the database for a financial account associated with the same name and SSN. The financial services system identifies the matching financial account by matching the personal information in the request with the corresponding information associated with a financial account, wherein the matching account is referred to as a "matching financial account."

At step 110, the financial services system transmits the financial account information for the matching financial account to the payroll processor. The financial account information includes sufficient information to set up direct deposit of the employee's pay checks into the matching financial account. The financial account information may include the bank routing number and the account number for the matching financial account, or other suitable information for setting up direct deposit. For foreign accounts, the financial account information may include a SWIFT number, IBAN and/or account number.

The financial account information for the matching financial account may be transmitted to the payroll processor by any suitable method. As some examples, the financial account information may be transmitted via email, or through an electronic communication network, such as the internet, a private network, wireless network, or combination thereof. Furthermore, the financial account information may be transmitted in an encrypted form to protect the information from unauthorized access. The encryption may utilize any suitable encryption algorithm, such as a public-key, private-key, or other encryption types.

In another aspect of step 110, the financial services system may transmit the account information for the matching financial account to the payroll processor only after receiving authorization from the employee. The authorization from the employee may be effected in any suitable manner, such as an email authorization from the employee, an authorization form signed by the employee and sent to the financial services provider, an authorization form signed by the employee and provided to the payroll processor and then sent to the financial services provider. Similarly, the financial services system may require authorization from the employee before it will receive the request from the payroll processor, or the authorization may be required along with the request at step 106 (of course, this is also before the financial services system transmits the account information for the matching financial account to the payroll processor).

At step 112, the payroll processor receives the financial account information, decrypts the information if it is encrypted, and uses the financial account information to set up direct deposit of pay checks for the employee to be deposited into the matching financial account. This process may be fully automated by a computerized payroll processing system, or it may also require manual entry by a representative of the payroll processor. For example, if the financial account information is transmitted via email to a representative of the payroll processor, the representative may need to enter the financial account information into the payroll processing system.

Figure 2:
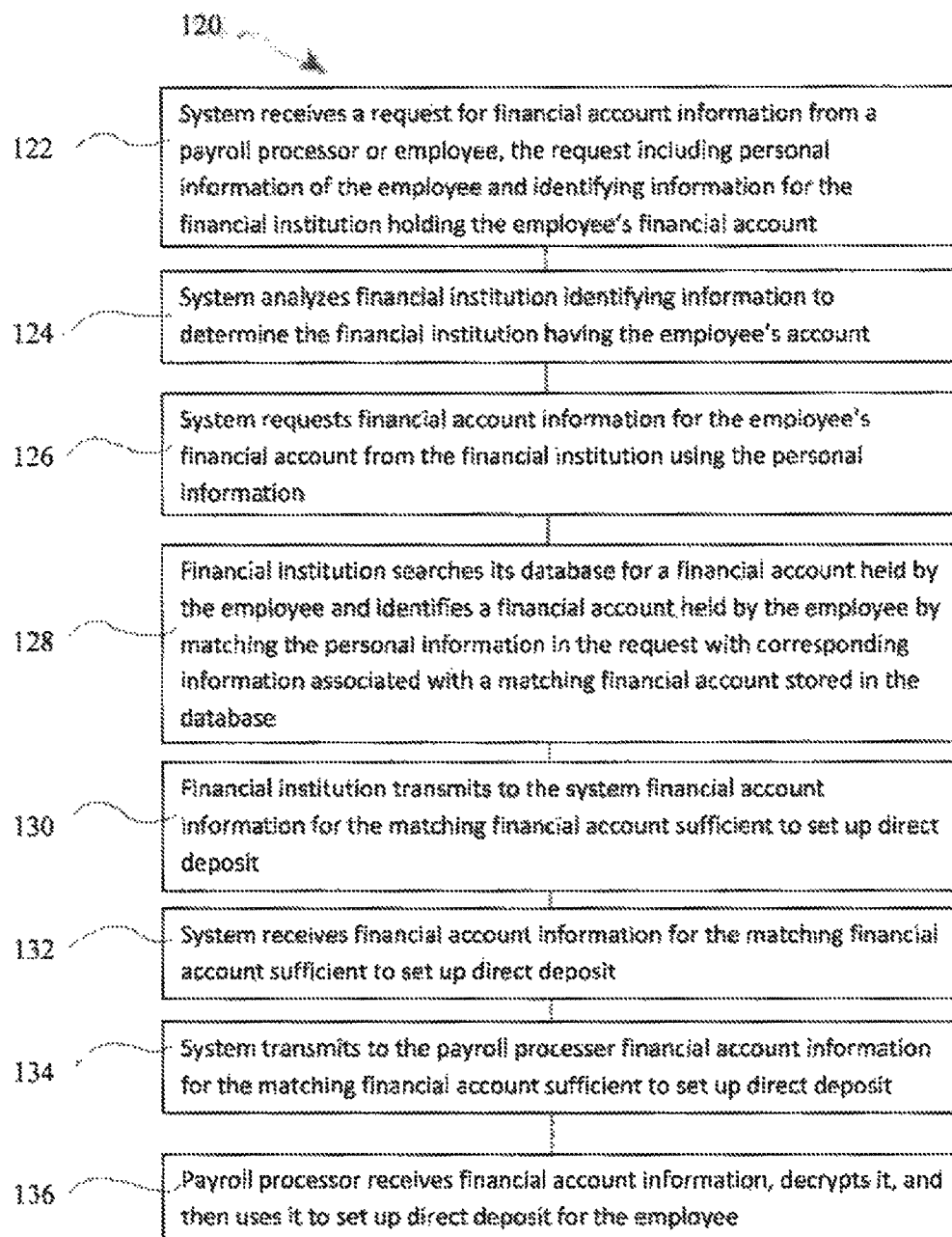
FIG. 2 is a flow chart of a method for providing financial account information for an employee for setting up direct deposit of pay checks into a financial account of an employee, according to another embodiment of the present invention.

Turning to FIG. 2, another embodiment of a computer implemented method 120 for providing financial account information to set up direct deposit of pay checks into a financial account of an employee is shown. The method 120 may be implemented on the same or similar financial services system 202 as described for implementing the method 100 above, and described in more detail below. The method 120 has many similarities to the method 100, except that instead of creating a database of financial account information, and searching the database for a matching financial account, the financial services system sends a request to a known financial institution at which the employee's account is held to obtain the financial account information for setting up direct deposit. In this case, the financial services system must be provided with the identity of the financial institution at which the employee has a financial account into which the employee is requesting direct deposit of pay checks. This may be most easily obtained from the employee, who will typically remember the name of her bank, but may not recall or have ready access to the bank routing number and her account number.

At step 122, the financial services system receives a request for financial account information from a payroll processor or employee. The financial services system may receive the request in the same ways as step 106 described above, and the description above for step 106 applies equally to step 122. The request includes personal information as described above for step 106, and also includes information identifying the financial institution at which the employee has a financial account for the direct deposit of pay checks. The financial institution identifying information may be the name of the financial institution, address, and/or other identifier.

The identifying information provided by the employee may not be the exact name of the financial institution, or there may be multiple financial institutions having the same name. Thus, at step 124, the financial services system may need to analyze the financial institution identifying information to determine the correct and/or exact financial institution having the employee's financial account. For instance, the financial services system may parse the identifying information, and compare and match the parsed information to a list of known financial institutions in a database of the system.

At step 126, the financial services system requests financial account information for the financial account of the employee directly from the financial institution using the personal information provided in the request from the payroll processor. The financial services system has identified the financial institution, either directly from the identifying information of the financial institution, or through step 124, so it can send the request to the correct financial institution. The request to the financial institution includes the personal information of the employee, as described above for step 106.

At step 128, the financial institution searches its financial account database for a financial account held by the employee by matching the personal information received in the request with corresponding information associated with a matching financial account stored in the database, similar to step 108 above. For instance, if the request includes a name and SSN, the financial institution searches its database for a financial account associated with the same name and SSN. The financial institution identifies the matching financial account by matching the personal information in the request with the corresponding information associated with a financial account, wherein the matching financial account is referred to as a "matching financial account."

At step 130, the financial institution transmits to the financial services system financial account information for the matching financial account sufficient to set up direct deposit, as described above (e.g. routing number and account number). This may be sent by any suitable means, such as the means described above for step 110. Similarly, the financial account information may be encrypted to prevent unauthorized access.

At step 132, the financial services system receives the financial account information for the matching financial account sufficient to set up direct deposit to the financial account.

At step 134, the financial services system transmits the financial account information for the matching financial account to the payroll processor, including sufficient information to set up direct deposit to the matching financial account. This step is the same as step 110 above, and the description for step 110 applies equally to step 134. The financial services system may decrypt the financial account information if it is encrypted when sent by the financial institution. It may then re-encrypt it, using a different encryption algorithm, or the same encryption algorithm, or leave it unencrypted for transmission to the payroll processor at step 136.

At step 136, the payroll processor receives the financial account information, decrypts it if it is encrypted, and sets up direct deposit of the employee's pay checks into the matching financial account using the financial account information.

Similar to method 100, in method 120, the financial services system may transmit the account information for the matching financial account to the payroll processor only after receiving authorization from the employee. The authorization from the employee may be effected in any suitable manner, such as an email authorization from the employee, an authorization form signed by the employee and sent to the financial services provider, an authorization form signed by the employee and provided to the payroll processor and then sent to the financial services provider. Similarly, the financial services system may require authorization from the employee before it will receive the request from the payroll processor, or the authorization may be required along with the request at step 122 (of course, this is also before the financial services system transmits the account information for the matching financial account to the payroll processor).

In another aspect of the methods 100 and 120, the provider of the service for providing financial account information for setting up direct deposit may charge a fee for providing the financial account information to the clients, such as payroll processors. For example, the provider may charge a subscription or membership fee on a time basis, such as a monthly, annual or other time period. Alternatively, the fee may charged based on the number of requests for financial account information made by the client to the provider of the financial services system. In this case, the fee may be based on the volume of requests, such as a reduced rate for a higher volume of requests. The fee may also be charged in advance or after the requests are fulfilled.

Figure 3:
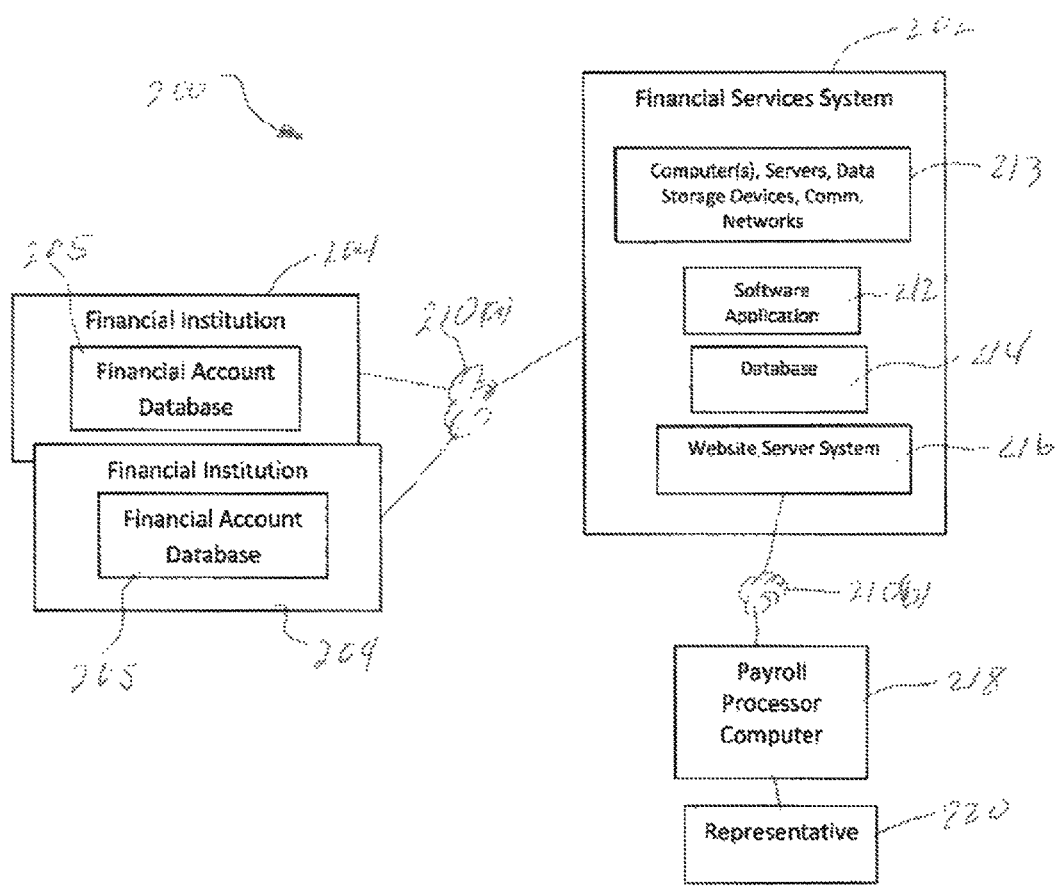
FIG. 3 illustrates a system for providing financial account information for an employee for setting up direct deposit of pay checks into a financial account of an employee, according to another embodiment of the present invention.

Referring now to FIG. 3, a non-limiting example of a system 200 for implementing any of the methods 100 and 120, as shown in FIGS. 1 and 2, as well as other method embodiments that are described herein, is depicted. It should be understood that not all of the components of the system 200 may be needed to implement each of the methods of the present invention, and therefore, the system may include only those components necessary to perform the method embodiments as described herein.

The system 200 comprises a financial services system 202 which is in communication with a plurality of financial institutions 204 through a communication network 210(*a*). Each of the financial institutions may have a financial account database 205. The financial services system 202 comprises one or more computers, servers, data storage devices, and a communication network linking the servers (collectively 213), and software 212 configured to perform the methods step performed by the financial services system 202, as described above. The financial services system 202 also comprises a database 214 of financial account information. The financial services system 202 is configured to access financial data from various sources electronically accessible by the system through the communication network 210(*a*), such as from the financial account databases 205 of financial institutions 206, or other sources as described above.

The financial services system 202 also comprises a website server system 216 which enables a website for clients such as a representative 220 using payroll processor computer 218 to access and use the financial services system 202. The website server system 216 comprises one or more computers, servers and website servers, as well as software programming and web pages for providing a website. The website server system 216 may be part of an online financial services system which provides a multitude of online services to clients, or it may be a standalone/dedicated system for providing financial account information for setting up direct deposit of pay checks for an employee. The website servers of the online bill payment system are in communication with a communication network 210(*b*), such as the internet. The website servers may comprise one or more computers which are connected through one or more networks, such as the internet and/or a private network, to the payroll processor computer 218.

Each of the networks 210(*a*)-(*b*) may include a proprietary network, LAN, WAN, cellular network, wireless network, the internet and/or other suitable network. As described above, the financial services system 202 and/or website server 216 may be operated by a third party service provider, a financial institution or a third party host. One example of a third party host that provides website servers for providing online financial services for financial institutions and their customers is Intuit Financial Services.

Figure 4:
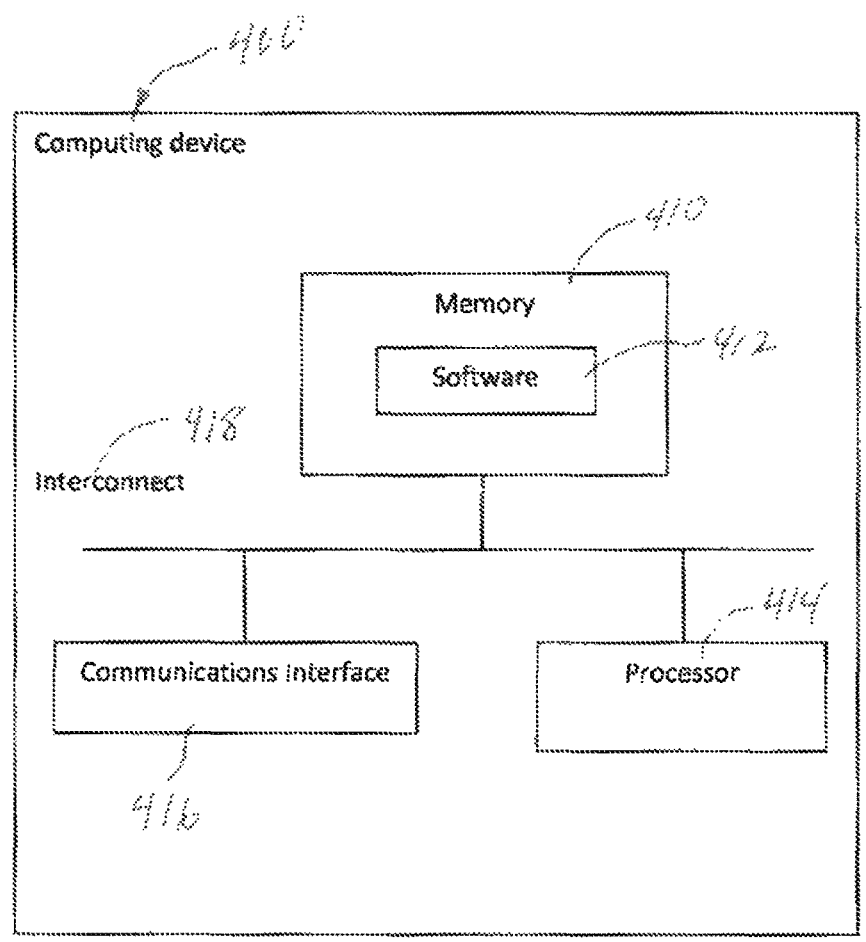
FIG. 4 is a block diagram of a computing device (computer) which may be utilized in the system of FIG. 3.

FIG. 4 generally shows a block diagram of the components of an example of a computer (computing device) 400 that may be used as the computer in the computers and servers identified in the system 200 of FIG. 3, such as the computer and servers 213 of the financial services system 202, and the website server system 216. The computer 400 includes a memory 410, application software 412, a processor or controller 414 to execute the application software 412, a network or communications interface 416, e.g., for communications with a network or interconnect 418 between the components. The memory 410 may be or include one or more of cache, RAM, ROM, SRAM, DRAM, RDRAM, EEPROM, SDRAM and other types of volatile or non-volatile memory capable of storing data. The processor unit 414 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 418 may include a system bus, LDT, PCI, ISA, or other types of buses, and the communications or network interface may, for example, be an Ethernet interface, a Frame Relay interface, or other interface. The network interface 416 may be configured to enable a system component to communicate with other system components across a network which may be a wireless network or various other communication networks. It should be noted that one or more components of computing device 400 may be located remotely and accessed via a network. Accordingly, the system configuration provided in FIG. 4 is provided to generally illustrate how embodiments may be configured and implemented.

Accordingly, a system 200 is provided which can be used to provide financial account information for a financial account of an employee for setting up direct deposit of pay checks.

The methods 100 and 120, as well as any other method embodiments described herein, may also be embodied in, or readable from, a non-transitory computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the methods 100 or 120, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially. Thus, the methods shown in FIGS. 1 and 2 are not intended to be limited to a particular sequential order, unless otherwise stated or required.

Accordingly, embodiments are intended to exemplify alternatives, modifications, and equivalents that may fall within the scope of the claims.

What is claimed is:

1. An automated computer-implemented method, comprising:
   communicating, by an intermediate computerized financial services system comprising a computer having at least one processor, a data storage device operably coupled to the at least one processor, with respective computers of respective financial institutions through respective networks, wherein respective financial institution computers include respective financial account databases;
   electronically accessing, by the intermediate computerized financial services system, respective financial account databases;
   constructing, by the intermediate computerized financial services system, a database, constructing the database comprising receiving, through respective networks, respective financial account information of respective financial account databases of respective financial institution computers and aggregating and storing received financial account information to the data storage device such that the constructed database of the intermediate computerized financial services system includes financial account information retrieved from financial accounts at said plurality of financial institutions;
   after construction of the database
   receiving, by the intermediate computerized financial services system and through a network, a request from a computer of a payroll processor of an employer of an employee for account information for a financial account held by the employee the request including personal information of the employee, the request comprising personal information of the employee,
   searching, by the intermediate computerized financial services system, the constructed database for the financial account held by the employee, identifying, by the intermediate computerized financial services system, said financial account held by the employee within the constructed database of the intermediate computerized financial services system by matching the personal information received in the request with corresponding information associated with a matching financial account stored in the constructed database, wherein the financial account is not currently associated with the employee by the payroll processor; and
   encrypting, by the intermediate computerized financial services system, the financial account information for the matching financial account retrieved from the constructed database of the intermediate computerized financial services system such that the encrypted account information is readable by the payroll processor computer but is not directly readable by a human, and
   transmitting, by the intermediate computerized financial services system, the encrypted financial account information through the network and to the computer of the payroll processor, the financial account information transmitted to the payroll processor computer being utilized to establish direct deposit of the employee's pay checks into the matching financial account.

2. The method of claim 1, wherein the financial account information of the constructed database includes a bank routing number and a bank account number.

3. The method of claim 1, wherein the personal information of the employee in the request includes the employee's name and social security number.

4. The method of claim 1, wherein the personal information of the employee in the request includes the employee's name, birth date and social security number.

5. The method of claim 1, wherein the step of searching the constructed database for the financial account held by the employee and identifying the financial account held by the employee by matching the personal information received in the request with corresponding information associated with a matching financial account stored in the constructed database, includes matching the employee's name and social security number provided in the request with the employee's name and social security number associated with a financial account stored in the constructed database.

6. The method of claim 1, wherein the intermediate computerized financial services system transmits the account information for the matching financial account to the computer of the payroll processor only after receiving authorization from the employee at the computerized financial services system.

7. The method of claim 1, wherein the computer of the payroll processor of the employer is a computer of one of the employer, a payroll department of the employer, a third party payroll processor contracted by the employer to process the payroll of the employer.

8. The method of claim 1, the intermediate computerized financial services system further comprising a website server system that provides a website, wherein the website server system including at least one website server that hosts a web page providing a website, further comprising the intermediate computerized financial services system providing access and use the financial services system website through a network.

9. An automated computing system, comprising:
   an intermediate computerized financial services system comprising a computer having at least one processor, a data storage device operably coupled to the at least one processor, the intermediate computerized financial services system being configured to:
   communicate with respective computers of respective financial institutions through respective networks, wherein respective financial institution computers include respective financial account databases,
   electronically access said respective financial account databases,
   construct a database by receiving, through said respective networks, respective financial account information of said respective financial account databases of respective financial institution computers and aggregating and storing received financial account information to the data storage device such that the constructed database of the intermediate computerized financial services system includes financial account information retrieved from financial accounts at a plurality of financial institutions, after construction of the database, receive, through a network, a request from a computer of a payroll processor of an employer of an employee for account information for a financial account held by the employee, the request including personal information of the employee;

search the constructed database for said financial account held by the employee and identifying said financial account held by the employee, which financial account is not currently associated with the employee by the payroll processor, identify said financial account held by the employee within the constructed database by matching the personal information received in the request with corresponding information associated with a matching financial account stored in the constructed database, wherein the financial account is not currently associated with the employee by the payroll processor encrypt the financial account information for the matching financial account retrieved from the constructed database of the intermediate computerized financial services system such that the encrypted account information is readable by the payroll processor computer buy is not directly readable by a human, and transmit account information for the matching financial account to the computer of the payroll processor, the financial account information transmitted to the payroll processor computer being utilized to establish direct deposit of the employee's pay checks into the matching financial account.

10. The system of claim 9, wherein the financial account information of the constructed database includes a bank routing number and a bank account number.

11. The system of claim 9, wherein the personal information of the employee in the request includes the employee's name and social security number.

12. The system of claim 9, wherein the personal information of the employee in the request includes the employee's name, birth date and social security number.

13. The system of claim 9, wherein the intermediate computerized financial services system is configured to search the constructed database for a financial account held by the employee and identify a financial account held by the employee by matching the personal information received in the request with corresponding information associated with a matching financial account stored in the constructed database by matching the employee's name and social security number provided in the request with the employee's name and social security number associated with the financial account stored in the constructed database.

14. The system of claim 9, wherein the computerized financial services system j configured to transmit the account information for the matching financial account to the computer of the payroll processor only after receiving authorization from the employee at the computerized financial services system.

15. The system of claim 9, wherein the computer of the payroll processor of the employer is a computer of one of the employer, a payroll department of the employer, a third party payroll processor contracted by the employer to process the payroll of the employer.

16. An article of manufacture comprising a non-transitory computer program carrier readable by an intermediate computerized financial services system comprising a computer having at least one processor, a data storage device operably coupled to the at least one processor and embodying instructions executable by the at least one processor of the computer to program the computer to perform the following steps for automatically providing financial account information for an employee for setting up direct deposit of pay checks into a financial account of the employee:

communicating with respective computers of respective financial institutions through respective networks, wherein respective financial institution computers include respective account databases;

electronically accessing said respective financial account databases;

constructing a database by receiving, through said respective networks, respective financial account information of said respective financial account databases of respective financial institution computers and aggregating and storing received financial account information to the data storage device such that the constructed database of the intermediate computerized financial services system includes financial account information retrieved from financial accounts at a plurality of financial institutions after construction of the database, receiving, through a network, a request from a computer of payroll processor of an employer of the employee for account information for a financial account held by the employee, the request including personal information of the employee, searching the constructed database for said financial account held by the employee and identifying said financial account held by the employee, by matching the personal information received in the request with corresponding information associated with a matching financial account stored in the constructed database, wherein the financial account is not currently associated with the employee by the payroll processor, encrypting the financial account information for the matching financial account retrieved from the constructed database of the intermediate computerized financial services system such that the encrypted account information is readable by the payroll processor computer by not directly readably by a human, and transmitting the encrypted financial account information to the computer of the payroll processor, the financial account information transmitted to the payroll processor computer being utilized to establish direct deposit of the employee's pay checks into the matching financial account.

17. The article of manufacture of claim 16, wherein the financial account information of the constructed database for setting up direct deposit of the employee's pay checks includes a bank routing number and a bank account number.

18. The article of manufacture of claim 16, wherein the personal information of the employee in the request includes the employee's name and social security number.

19. The article of manufacture of claim 16, wherein the personal information of the employee in the request includes the employee's name, birth date and social security number.

20. The article of manufacture of claim 16, wherein the step of searching the constructed database for a financial account held by the employee and identifying a financial account held by the employee by the intermediate computerized financial services system matching the personal information received in the request with corresponding information associated with a matching financial account stored in the constructed database, includes matching the employee's name and social security number provided in the request with the employee's name and social security number associated with the financial account stored in the constructed database.

21. The article of manufacture of claim 16, wherein the instructions are executable to program the computer of the computerized financial services system to transmit the account information for the matching financial account to the computer of the payroll processor only after receiving authorization from the employee at the computerized financial services system.

22. The article of manufacture of claim 16, wherein the computer of the payroll processor of the employer is one of a computer of the employer, a payroll department of the employer, a third party payroll processor contracted by the employer to process the payroll of the employer.

\* \* \* \* \*